(12) United States Patent
Zlamany et al.

(10) Patent No.: US 10,146,813 B2
(45) Date of Patent: Dec. 4, 2018

(54) SINGLE TABLE INDEX RELATIONAL DATABASE

(71) Applicant: DocConnects, LLC, Bronx, NY (US)

(72) Inventors: Stephen Zlamany, Shelton, CT (US); Solomon Redlich, Riverdale, NY (US); Eitan Kimelman, New York, NY (US)

(73) Assignee: DocConnects, LLC, Bronx, NY (US)

( * ) Notice: Subject to any disclaimer, the term of this patent is extended or adjusted under 35 U.S.C. 154(b) by 443 days.

(21) Appl. No.: 14/792,602

(22) Filed: Jul. 6, 2015

(65) Prior Publication Data

US 2016/0004752 A1 Jan. 7, 2016

Related U.S. Application Data

(60) Provisional application No. 62/020,575, filed on Jul. 3, 2014.

(51) Int. Cl.
*G06F 7/00* (2006.01)
*G06F 17/30* (2006.01)
*G06F 15/16* (2006.01)

(52) U.S. Cl.
CPC .... *G06F 17/30321* (2013.01); *G06F 17/3053* (2013.01); *G06F 17/30595* (2013.01)

(58) Field of Classification Search
CPC .......... G06F 17/30321; G06F 17/3053; G06F 17/30595
USPC ....................................................... 707/725
See application file for complete search history.

(56) References Cited

U.S. PATENT DOCUMENTS

| | | | | | |
|---|---|---|---|---|---|
| 5,515,531 | A | * | 5/1996 | Fujiwara | G06F 17/30321 707/999.003 |
| 5,551,027 | A | * | 8/1996 | Choy | G06F 17/30321 707/999.201 |
| 5,685,003 | A | * | 11/1997 | Peltonen | G06F 17/30622 707/999.001 |
| 6,438,562 | B1 | * | 8/2002 | Gupta | G06F 17/30336 707/696 |
| 6,546,394 | B1 | * | 4/2003 | Chong | G06F 17/30339 707/999.1 |
| 2007/0203925 | A1 | * | 8/2007 | Sandler | G06F 17/30333 707/999.1 |
| 2012/0284258 | A1 | * | 11/2012 | Liu | G06F 17/30327 707/722 |

* cited by examiner

*Primary Examiner* — Usmaan Saeed
*Assistant Examiner* — Brian E. Weinrich
(74) *Attorney, Agent, or Firm* — FisherBroyles, LLP; Ariel Reinitz

(57) ABSTRACT

Technologies are disclosed for indexing and searching using a single table index. A processing device receives a query and processes a global index associated with a database with respect to the query to identify corresponding identifiers and/or strings, processes indexes associated with data items within the database with respect to the identifiers and/or strings, scans adjacent rows in the index that include identifiers and/or strings, identifies identifiers that are associated with the identifiers and/or strings, scans rows of the indexes to identify additional rows that also include the other identifiers, identifies search results in response to the query, prioritizes the search results based on priority status indicators associated with the search results, and provides the search results, as prioritized, in response to the query.

20 Claims, 15 Drawing Sheets

| | | | |
|---|---|---|---|
| A. | 1] 1001 (108A) | Case | |
| B. | 2] 1010.1001.3484(112A) | Case{s}.Case.14-01045 | |
| C. | 2] 1010.1001.3522(112J) | Case{s}.Case.No. 01045 | |
| D. | 2] 1010.1001.3484.5672(114-2A) | 14-01045...01045... | |
| E. | 2] 1010.1001.3522.5672(114-2E) | No. 01045...01045... | |
| F. | 2] 1010.1001 (104A) | Case | |
| G. | 1] 1010 (102A) | Case{s} | |
| H. | 1] 1010.1001(104A) | Case | |
| I. | 1] 1010.1001.3484(112A) | Case{s}.Case.14-01045 | |
| J. | 1] 1010.1001.3522(112J) | Case{s}.Case.No. 01045 | |
| K. | 1] 1010.1001.3484.5672(114-2A) | 14-01045...01045... | |
| L. | 1] 1010.1001.3522.5672(114-2E) | No. 01045...01045... | |
| M. | 1] 3484 (110A) | 14-01045 | ◄─── #1 Search |
| N. | 3] 1010.1001.3484(112A) | Case{s}.Case.14-01045 | |
| O. | 3] 1010.1001.3484.5672(114-2A) | 14-01045...01045... ◄─── #2 Scan up/down |
| P. | 1] 3522(110J) | No. 01045 | |
| Q. | 3] 1010.1001.3522(112J) | Case{s}.Case.No. 01045 | |
| R. | 3] 1010.1001.3522.5672(114-2E) | No.01045...01045... | |
| S. | 1] 5672(114-1A) | ...01045... | ◄─── #3 Search |
| T. | 4] 1010.1001.3484.5672(114-2A) | 14-01045...01045... | |
| U. | 4] 1010.1001.3522.5672(114-2E) | No. 01045...01045... ◄─── #4 Scan up/down |

| | | |
|---|---|---|
| *Value* V 110 | | Value "learned" through discovery or other input |
| *Discovery* D C A B E + V 112 | | Fully qualified data element - Anchor combined with Value |
| *Similarity* 114-1 S C A B E + V & S 114-2 | | "Backend" relationship expressing similar values |
| *Group* 116-1 G C A B E + V & G 116-2 | | "Backend" relationship expressing grouped values |

| | | | | |
|---|---|---|---|---|
| 1 | Categorizer | C 102A | 1010 | *Case(s)* |
| 2 | End Point | E 108A | 1001 | Case |
| 3 | Anchor | A C(E)+E 104A | 1010.1001 | Case (or Case(s)).Case) |
| 4 – 11 | See Fig 1B | | | |
| 12 | *Value* | V 110A | *3484* | *14-01045* |
| 13 | Discovery | D C A B E + V 112A | 1010.1001.*3484* | Case (or Case(s)).Case) *14-01045* |
| 14 | *Similarity* & *Value* | S V & S 114-1A | *5672* | *01045...* |
| 15 | *Similarity* of Discovery | S C A B E + V + S 114-2A | 1010.1001.*3484.5672* | Case (or Case(s)).Case) *14-01045...01045...* |

FIG. 1C 1010 (102A)                  Case{s}
1001 (108A)                  Case
1010.1001 (104A)             Case
3484 (110A)                  14-01045
3522 (110J)                  No.01045
1010.1001.3484 (112A)        Case{s}.Case.14-01045
1010.1001.3522 (112J)        Case{s}.Case.No.01045
5672 (114-1A)                ...01045...
1010.1001.3484.5672 (114-2A) 14-01045...01045...
1010.1001.3522.5672 (114-2E) No.01045...01045...

FIG. 1E

A.   1] 1001 (108A)                   Case
B.   2] 1010.1001.3484 (112A)         Case{s}.Case.14-01045
C.   2] 1010.1001.3522 (112J)         Case{s}.Case.No. 01045
D.   2] 1010.1001.3484.5672 (114-2A) 14-01045...01045...
E.   2] 1010.1001.3522.5672 (114-2E) No. 01045...01045...
F.   2] 1010.1001 (104A)              Case
G.   1] 1010 (102A)                   Case{s}
H.   1] 1010.1001 (104A)              Case
I.   1] 1010.1001.3484 (112A)         Case{s}.Case.14-01045
J.   1] 1010.1001.3522 (112J)         Case{s}.Case.No. 01045
K.   1] 1010.1001.3484.5672 (114-2A) 14-01045...01045...
L.   1] 1010.1001.3522.5672 (114-2E) No. 01045...01045...
M.   1] 3484 (110A)                   14-01045              ◄────── #1 Search
N.   3] 1010.1001.3484 (112A)         Case{s}.Case.14-01045
O.   3] 1010.1001.3484.5672 (114-2A) 14-01045...01045...◄────── #2 Scan up/down
P.   1] 3522 (110J)                   No. 01045
Q.   3] 1010.1001.3522 (112J)         Case{s}.Case.No. 01045
R.   3] 1010.1001.3522.5672 (114-2E) No.01045...01045...
S.   1] 5672 (114-1A)                 ...01045...           ◄────── #3 Search
T.   4] 1010.1001.3484.5672 (114-2A) 14-01045...01045...
U.   4] 1010.1001.3522.5672 (114-2E) No. 01045...01045...◄────── #4 Scan up/down

FIG. 1F

| # | | | Name(s) |
|---|---|---|---|
| 1 | Categorizer | C 102D | 1020 | Name(s) |
| 2 | End Point | E 108D | 1017 | Name |
| 3 | Anchor | A C·(B) + E 104D 102E | 1020.1017 | Name (or Name{s}.Name) |
| 4 | Categorizer | C 102E | 1015 | Party{ies} |
| 5 | Bridge | B C + C 106C 102F | 1020.1015 | = Parties = . = Plaintiff = |
| 6 | Categorizer | C 102F | 1025 | Plaintiff{s} |
| 7 | Bridge | B C + C 106D 102G | 1020.1015.1025 | = Parties = . = Defendant = |
| 8 | Categorizer | C 102G | 1035 | Defendant{s} |
| 9 | Bridge | B C + C 106E 102H | 1020.1015.1035 | = Parties = . = Defendant = |
| 10 | Categorizer | C 102H | 1045 | Attorney{s} |
| 11 | Bridge | B C + C 106F 102I | 1020.1045 | = Attorney = |
| 12 | Categorizer | C 102I | 1055 | Judge{s} |
| 13 | Bridge | B C + C 106G 102J | 1020.1055 | = Judge = |
| 14 | Categorizer | C 102J | 1065 | Magistrate Judge{s} |
| 15 | Bridge | B C + C 106H | 1020.1065 | = Magistrate Judge = |
| 16... | See Fig 2B | | | |

FIG. 2A

| | | | | |
|---|---|---|---|---|
| 1 - 15 | See Fig 2A | | | |
| 16 | End Point | E _108E_ _104E_ | 1321 | Plaintiff |
| 17 | Anchor | A C{B} + E | 1020.1015.1025.1321 | Plaintiff |
| 18 | End Point | E _108F_ _104F_ | 1322 | Defendant |
| 19 | Anchor | A C{B} + E | 1020.1015.1035.1322 | Defendant |
| 20 | End Point | E _108G_ _104G_ | 1323 | Attorney |
| 21 | Anchor | A C{B} + E | 1020.1045.1323 | Attorney |
| 22 | End Point | E _108H_ _104H_ | 1324 | Judge |
| 23 | Anchor | A C{B} + E | 1020.1055.1324 | Judge |
| 24 | End Point | E _108I_ _104I_ | 1325 | Magistrate Judge |
| 25 | Anchor | A C{B} + E | 1020.1065.1325 | Magistrate Judge |
| | ...Taught Above / | | Learned Below... | |
| 26 - 35 | See Fig 2C | | | |

FIG. 2B

| | | | | |
|---|---|---|---|---|
| 1-25 | See Fig 2B | | ...Taught Above / | Learned Below... |
| 26 | | V (110G, 112G) | Value | 3501 |
| 27 | | D CABE+V (110H, 112H) | Discovery | 1020,1055,1324,3501 |
| 28 | | V (110I, 112I) | Value | 3502 |
| 29 | | D CABE+V | Discovery | 1020,1015,1035,1322,3502 |
| 30 | | V | Value | 3503 |
| 31 | | D CABE+V | Discovery | 1020,1045,1323,3503 |
| 32 | | G V&G (116-1A, 116-2A) | Group + Value | 6123 |
| 33 | | G CABE+V+G (116-2B) | Group of Discovery | 1020,1055,1324,3501,6123 |
| 34 | | G CABE+V+G (116-2C) | Group of Discovery | 1020,1015,1035,1322,3502,6123 |
| 35 | | G CABE+V+G (116-2D) | Group of Discovery | 1020,1045,1323,3503,6123 |

| | |
|---|---|
| | Honorable Smith |
| | Judge,Honorable Smith |
| | Mr. Jones |
| | Plaintiff,Mr. Jones |
| | Peters, ESQ |
| | Attorney,Peters, ESQ |
| | ...Judge Smith, Plaint Jones, Atty Peters |
| | Judge,Honorable Smith, Judge Smith, Plaint Jones, Atty Peters |
| | Plaintiff,Mr. Jones,,Judge Smith, Plaint Jones, Atty Peters |
| | Attorney,Peters, ESQ,,Judge Smith, Plaint Jones, Atty Peters |

FIG. 2C

| SSN | Name | DOB | Department | Status |
|---|---|---|---|---|
| 123-45-6789 | Robert Smith | 01/01/1970 | ACCOUNTING | Active |
| 222-33-4444 | Janet Jones | 07/15/1980 | ACCOUNTING | Active |
| 777-11-1234 | James Allen | 01/01/1970 | ACCOUNTING | Inactive |

FIG. 5

SINGLE TABLE INDEX RELATIONAL DATABASE

CROSS-REFERENCE TO RELATED APPLICATIONS

This application is related to and claims the benefit of U.S. Patent Application No. 62/020,575, filed Jul. 3, 2014, which is incorporated herein by reference in its entirety.

TECHNICAL FIELD

Aspects and implementations of the present disclosure relate to data processing, and more specifically, to indexing and searching using a single table index.

BACKGROUND

In traditional relational databases, the existing structure of the database must be altered in order to incorporate a new item, category, etc., such as by creating a new table and/or adding new columns to the traditional relational database framework. Additionally, in traditional relational databases, typically only certain fields are 'keyed' into an index for quick lookup.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

In an aspect of the present disclosure, a processing device receives a query. The processing device processes a global index associated with a database with respect to the query to identify at least one of (a) one or more identifiers or (b) one or more strings within the global index that correspond to the query. The processing device processes, based on an identification of the at least one of (a) one or more identifiers or (b) one or more strings within the global index that correspond to the query, one or more indexes associated with one or more data items within the database with respect to the at least one of (a) one or more identifiers or (b) one or more strings. The processing device scans, based on an identification of a presence of the at least one of (a) the one or more identifiers or (b) the one or more strings within a row of at least one of the one or more indexes, one or more rows of the at least one of the one or more indexes to identify one or more additional rows of the at least one of the one or more indexes that also include the at least one of (a) the one or more identifiers or (b) the one or more strings. The processing device identifies, based on a scan of the one or more rows of the at least one of the one or more indexes, one or more other identifiers within the one or more rows that are associated with the at least one of (a) the one or more identifiers or (b) the one or more strings. The processing device scans one or more rows of the at least one of the one or more indexes to identify one or more additional rows of the at least one of the one or more indexes that also include the one or more other identifiers. The processing device identifies, based on the scanning of the one or more rows, one or more search results in response to the query. The processing device prioritizes the one or more search results based on one or more respective priority status indicators associated with the one or more search results. The processing device provides the one or more search results, as prioritized, in response to the query.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIGS. 1A-F depict various exemplary aspects of the technologies described herein.

FIGS. 2A-D depict various further exemplary aspects of the technologies described herein.

FIG. 5 depicts various further exemplary aspects of the technologies described herein.

DETAILED DESCRIPTION

Described herein in various implementations are technologies that enable the establishment of relational constructs with respect to data items (e.g., files, documents, information/data records, etc.), with respect to which efficient search and retrieval operations can be performed, such as in concept-based searching contexts/scenarios. In certain implementations, a storage structure (e.g., an alphanumeric storage index) capable of recording both values and concepts as components (e.g., identifiers and/or strings) within a single table index can be utilized (it should be understood that, in various implementations, the single table index as described and/or referenced herein may be partitioned, such as across multiple storage devices, etc.). Various composite components can be constructed to include/incorporate one or more values and/or concepts, as well as multiple attributes/characteristics, and such components can be stored both individually and collectively within the index. Additionally, various components can be defined with respect/in relation to other components present within the index. Moreover, concepts and values may be stored along with a rating which reflects the veracity of the data. Data stored in the single table index can be efficiently retrieved through use of binary search techniques in conjunction with a depth indicator, such as in a manner described herein. In doing so, search results that are likely to be highly relevant to the received search query can be efficiently retrieved, even in scenarios in which the query alone may be too general or ambiguous to result in relevant results using other search techniques.

One or more data items (e.g., files, documents, records, etc.) can be associated with one or more index attributes and/or strings. In certain implementations, an attribute can correspond to a concept, category, individual, entity, value, etc., associated with the data item, while a string can correspond to a series of such attributes that are grouped or combined together with respect to the data item. Additionally, each data item can be associated with an index that contains one or more attributes and/or strings associated with the data item. Such an index can be searched (e.g., with respect to search terms that correspond/relate to the various attributes/strings) in order to identify/retrieve relevant data items.

The referenced attributes can be identified and/or generated in any number of ways. In certain implementations, the content of the data item itself can be processed, parsed, and/or otherwise analyzed in order to identify such attributes, while in other implementations such attributes can be provided or obtained from other sources (e.g., from a pre-established data source such as an existing database, via manual input, etc.). Each attribute (e.g., a category, individual, value, etc.) can correspond to a unique identifier (e.g., an alphanumeric identifier, such as in Base64 and/or in any other such encoding).

Figure 1A:
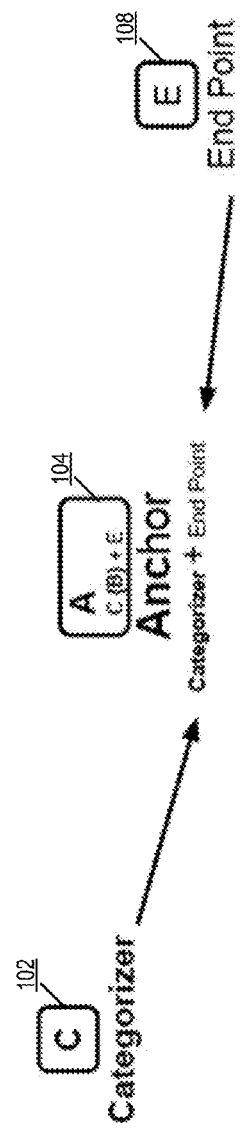
Figure 1B:
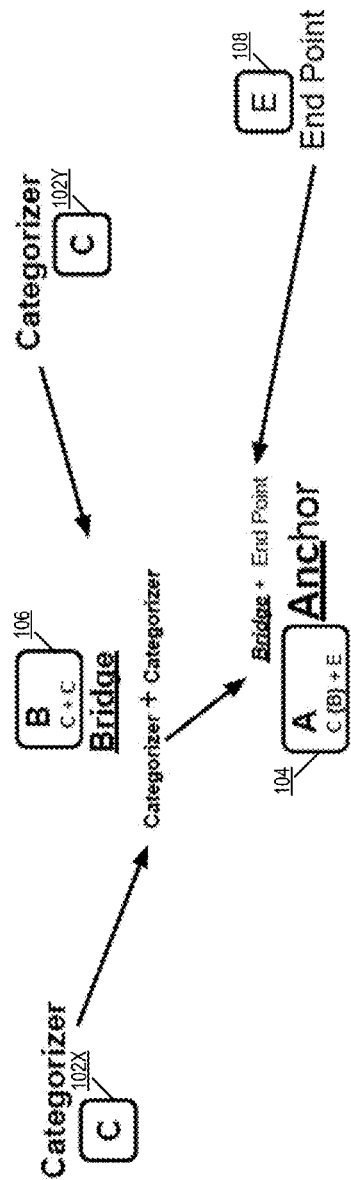

FIGS. 1A and 1B illustrate various aspects and examples of such identifiers/strings. As depicted in FIG. 1A, in a setting in which various data items such as legal/court documents, records, filings, etc., are being indexed, one identifier (e.g., '1001') can indicate that an associated data item corresponds to a legal case. Accordingly, those data items (e.g., documents, records, etc.) associated with a legal case (of any type) can be associated with the identifier '1001.' Other identifiers can correspond to the type of case that the data item pertains to. For example, the identifier '1005' can correspond to a civil case while the identifier '1055' can correspond to a criminal case. Accordingly, it can be appreciated that the referenced identifiers can be combined or grouped to create strings which reflect combinations of multiple identifiers associated with a particular data item. For example, the string '1001.1005' can reflect that the associated data item (e.g., document) is both (a) associated with a legal case and (b) associated with a civil case, while the string '1001.1055' can reflect that the associated data item is both (a) associated with a legal case and (b) associated with a criminal case. In this manner, multiple identifiers (each of which correspond to various aspects, concepts, entities, etc., associated with the data item) can be further combined to create strings which are stored in an index associated with the corresponding data item. For example, in a scenario in which legal documents are being indexed, further identifiers can be generated/added which may correspond to items such as plaintiff name, defendant name, judge name, case number, attorney name, etc.

It should be noted that, in various implementations, the referenced identifiers can correspond to practically any attribute, concept, or value associated with a particular data item. Additional examples of such identifiers include, but are not limited to: the source of the data (e.g., data sets, documents, records, human input, sensor or tracking data, web crawlers and trackers, machine learning, etc.), the type and/or format of the data (e.g., file sets of multiple formats, data pools, SQL and other database tables, etc.), category (e.g., grouping of data with similar or related data, such as may be reflected in the data itself and/or identified such as in a manner described herein), value (e.g., an alphanumeric number such as a case number, document number, ID number, etc.) and/or relationships (e.g., how the data are related to other data, such as with respect to hierarchies such as parent-child relationships, lateral/sibling relationships, etc., such as, for example, case/record number-client/patient, client-attorney, disease-patient, team name-location, etc.). It should also be noted that in some cases the referenced relationships may be universal (that is, they may be present across all data items and scenarios), while in other scenarios such relationships may exist only within a particular data set (e.g., record #100 is associated with John Smith only within a specific data set). The universal/particular nature of such relationships can also be recorded/reflected the nature of the relationship, such as based on other available data (for example, is a relationship specific to certain data items or is it more broadly applicable).

Moreover, in certain implementations, one or more identifiers that reflect various relationships and/or similarities can be generated and/or associated with a data item. Such relationships and/or similarities can, for example, be between two (or more) data items and/or identifiers. For example, an identifier can be generated that corresponds to the relationship between multiple identifiers, such as the presence of a particular plaintiff, a particular judge, and a particular attorney (e.g., with respect to the same case, document, record, etc.). A unique identifier associated with such a relationship can be generated and included within the index associated with a given data item. In doing so, data items (e.g., documents, records, etc.) having similar characteristics (e.g., sharing the same combination of identifiers, such as documents for different cases each of which share the same plaintiff, judge, and attorney) can be retrieved when searching the indexes associated with the documents in a database/repository (e.g., by searching for the referenced identifier that corresponds to such a combination of identifiers). Various examples of such relationships are reflected in FIGS. 2A-2D and described in greater detail herein.

By way of further example, an identifier can be generated that reflects an identified/perceived similarity, such as between two or more data items. For example, it can be appreciated that, with respect to identifiers that correspond to numerical values, such values can be identified as being relatively similar (although not identical) to one another. For example, the values of '12345' and '12345-00' can be identified as being relatively similar to one another (in that they both contain '12345,' despite not being identical. In identifying such values as similar, an identifier (e.g., '5672') can be associated with the corresponding data items (e.g., data items containing/associated with '12345' or '12345-00') indicating that such items are contain a similar value and thus may potentially be substantively related to one another (e.g., in a scenario in which both values are actually equivalent to one another).

By way of further illustration, FIGS. 1A-C further illustrate various identifiers/strings, such as those described herein. As depicted in FIG. 1A, such identifiers (whether single identifiers and/or combinations thereof) can be characterized as various attributes, such as categorizer(s) 102 ('C,' as depicted/referenced in FIGS. 1A-2D) (which can, for example, correspond to a predetermined category, e.g., case(s)), endpoint(s) 108 ('E,' as depicted/referenced in FIGS. 1A-2D) (which can, for example, correspond to a single component, such as a predetermined category or sub-category that can be used to describe values, and/or can be a value with predetermined conceptual meaning (e.g., notions), such as case, civil case, criminal case, etc.), anchor(s) 104 ('A,' as depicted/referenced in FIGS. 1A-2D) (which can, for example, be the combination of categorizer, an optional bridge, and an endpoint, and can correspond to a fully qualified schema object), and/or bridge(s) 106 ('B,' as depicted/referenced in FIGS. 1A-2D) (which can be used to create connections between more than one categorizer, thereby reflecting/expressing relationships such as between several concepts). Such attributes can be said to be 'taught' in that such attributes define the structure of various relationships, such as in the manner described herein.

It should also be noted that additional identifiers can be generated to reflect relationships/similarities between any number of other identifiers (e.g., reflecting a composite of multiple relationships, similarities, etc.). It should also be understood that the identifiers described herein are merely exemplary, and that any number of additional identifiers can be similarly utilized. Examples of such identifiers include but are not limited to temporal identifiers (which can reflect, for example, the relative and/or absolute age of a particular data item), relevancy identifiers, and/or accessibility identifiers. By way of illustration, a temporal identifier can reflect various significant moments that occur with respect to a data item (e.g., a document), such as times, dates, etc., associated with its creation, instances of discovery, modification, maturation (which can allow for further defining concepts without compromising relational integrity), and deletion. By way of further illustration, accessibility/security identifiers can reflect various attributes associated with security, can govern access, define users (e.g., user roles, permissions, etc.), can be used to determine relevancy (e.g., as described herein), and can be used for best practices (e.g., how long a file is kept for—which can be related to temporal identifiers).

Additionally, in certain implementations one or more relevance attributes (e.g., multi-faceted priority status numbers (PSN)) can be assigned to each identifier and/or string within the index. Such PSNs can be configured to monitor/maintain the status associated with various data conditions, including but not limited to: accuracy of the data (e.g., how closely the data relates to its origin), relevancy of the data (e.g., how closely the data relates to what a user or application is seeking), control of the data (e.g. using PSN to restrict data access and/or implement data security), and significance of the data (e.g., how applicable the data is for a specific purpose or use—for example, this factor can be used in order to utilize the data for many purposes, including but not limited to: search suggestions, data summaries, reporting, and alerts). Such ratings can be constantly and/or periodically monitored and updated and can be based on any number of factors and/or attributes, including but not limited to: data source, including but not limited to: human input pre-coded data, and data discovered based on specific rules or attributes (it should be noted that data discovered in multiple categories can affect the referenced PSN rating), machine learning, and predictive coding.

As described above, multiple identifiers can be grouped or combined into identifier strings which reflect the association of various identifiers with respect to one another. In doing so, the context or relevance of such identifiers can be defined, such as based on/with respect to the combination or hierarchy of such grouped identifiers. For example, as depicted in FIGS. 2A-C, the identifier '1020' can correspond to 'names', '1055' can correspond to 'judges,' '1324' can correspond to 'judge' and '3501' can correspond to 'Honorable Smith.' Thus, the string '1020.1055.1324.3501' can correspond to Honorable Smith, and, based on the grouping of the 'Honorable Smith' identifier with identifiers that correspond to 'judge,' 'judges, and 'names,' it can be determined that 'Honorable Smith' is the name of an individual judge (who may be among a group of judges).

Moreover, one identifier can be associated/grouped with one or more other identifiers (i.e., to generate a string, such as is illustrated above) in any number of ways. For example, in certain implementations, the structure of existing strings can be analyzed (e.g., using machine learning techniques, such as are known to those of ordinary skill in the art) in order to identify/determine one or more patterns. For example, through an analysis of existing strings (e.g., those corresponding to other data items) it can be determined that the string '1020.1055.1324' (which, as noted above, corresponds to 'names,' judges,' 'judge,') commonly appears together with a name that begins 'Honorable . . . . ' Accordingly, upon parsing a data item (e.g., a document, record, etc.) and/or otherwise identifying a name beginning 'Honorable . . . ,' it can be determined that such a name is also likely to be associated with the same string (i.e., '1020.1055.1324'). In doing so, for example, a name (e.g., 'Honorable Smith') (or any other such item) can be associated/grouped with other identifiers that are likely to be relevant (e.g., based on patterns observed/identified in other strings), thereby creating a string that reflects/illustrates various aspects of a concept/attribute associated with a data item (e.g., that Judge Smith, who is a judge, is associated with a particular document, case, etc.).

As depicted in FIG. 1C, various identifiers/strings, (whether single identifiers and/or combinations thereof) can be characterized as other attributes, such as value(s) 110 ('V,' as depicted/referenced in FIGS. 1C, 2C, and 2D) (which can be, for example, a single component which can correspond to a value determined or 'learned' through discovery or other input), discoverie(s) 112 ('D,' as depicted/referenced in FIGS. 1C, 2C, and 2D) (which can be a composite attribute made up of a categorizer, optionally a bridge, an endpoint (that is, an anchor) and a value, and which can, for example, describe or characterize a value in terms of preconceived notions and/or can be a fully qualified data element), similaritie(s) 114 ('S,' as depicted/referenced in FIG. 1C) (which can be a 'backend' relationship and which can reflect, for example, the relationship between values (such as within the same discovery family) based on their similarity to each other, as depicted with respect to similarity 114-1, and/or the relationship between discoveries based on their similarity to one another, as depicted with respect to similarity 114-2,), and grouping(s) 116 (which can be a 'backend' relationship and which can reflect, for example, the relationship between values, as depicted with respect to grouping 116-1, and/or the relationship between discoveries (e.g., outside the same family) as depicted with respect to grouping 116-2). Such attributes can be thought of as being determined or 'learned' in that they are identified/generated as data items are recorded/processed, such as within a database or data repository.

Figure 1D:
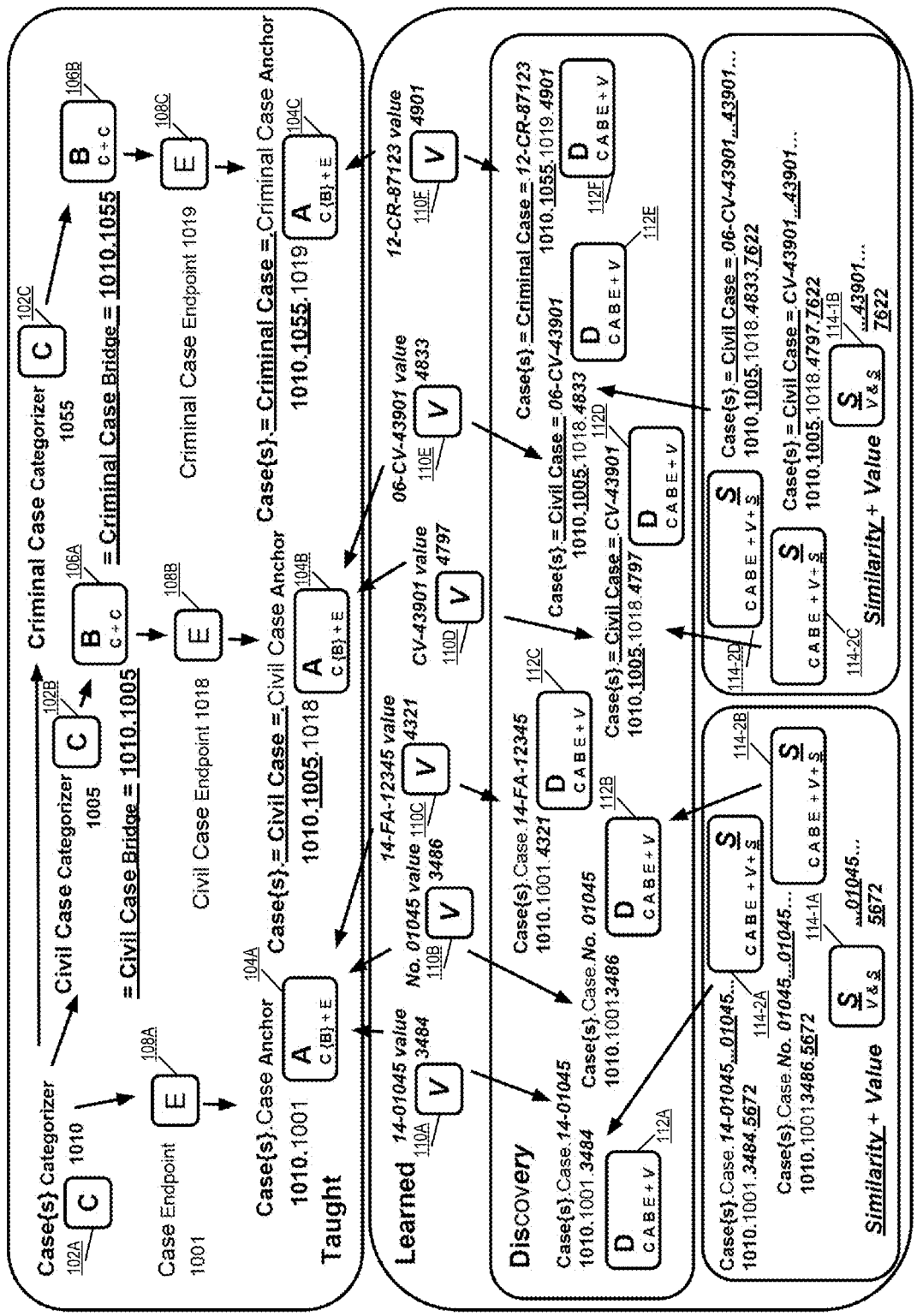

FIG. 1D further depicts various relationships between the identifiers/attributes depicted in FIGS. 1A-C and described herein, such as between and among categorizers 102A-C, anchors 104A-C, bridges 106A-B, endpoints 108A-C, values 110A-F, discoveries 112A-F, and similarities 114-1A-B and 114-2A-D. For example, as depicted in FIG. 1D, categorizer 102A ('1010') and categorizer 102B ('1005') can be combined into bridge 106A ('1010.1005'). As also depicted, bridge 106A can be combined with endpoint 108B ('1018'), thereby creating anchor 104B ('1010.1005.1018'). Value 110D ('4797') and value 110E ('4833') can be combined with anchor 104B, thereby creating discovery 112D ('1010.1005.1018.4797') (as has been described herein, the association between value 110D and anchor 104B can be learned or discovered, such as based on the presence/use of the referenced value in conjunction with the referenced anchor and/or components thereof). Discovery 112D ('1010.1005.1018.4797') can be combined with similarity 114-1B ('7622'), thereby creating similarity 114-2C ('1010.1005.1018.4797.7622') (as has been described herein, the referenced similarity can reflect, for example, a similarity between another value and/or components thereof and value 110D). In a similar fashion, it will be apparent that various other relationships between other identifiers/strings are also illustrated in FIG. 1D.

Figure 2D:
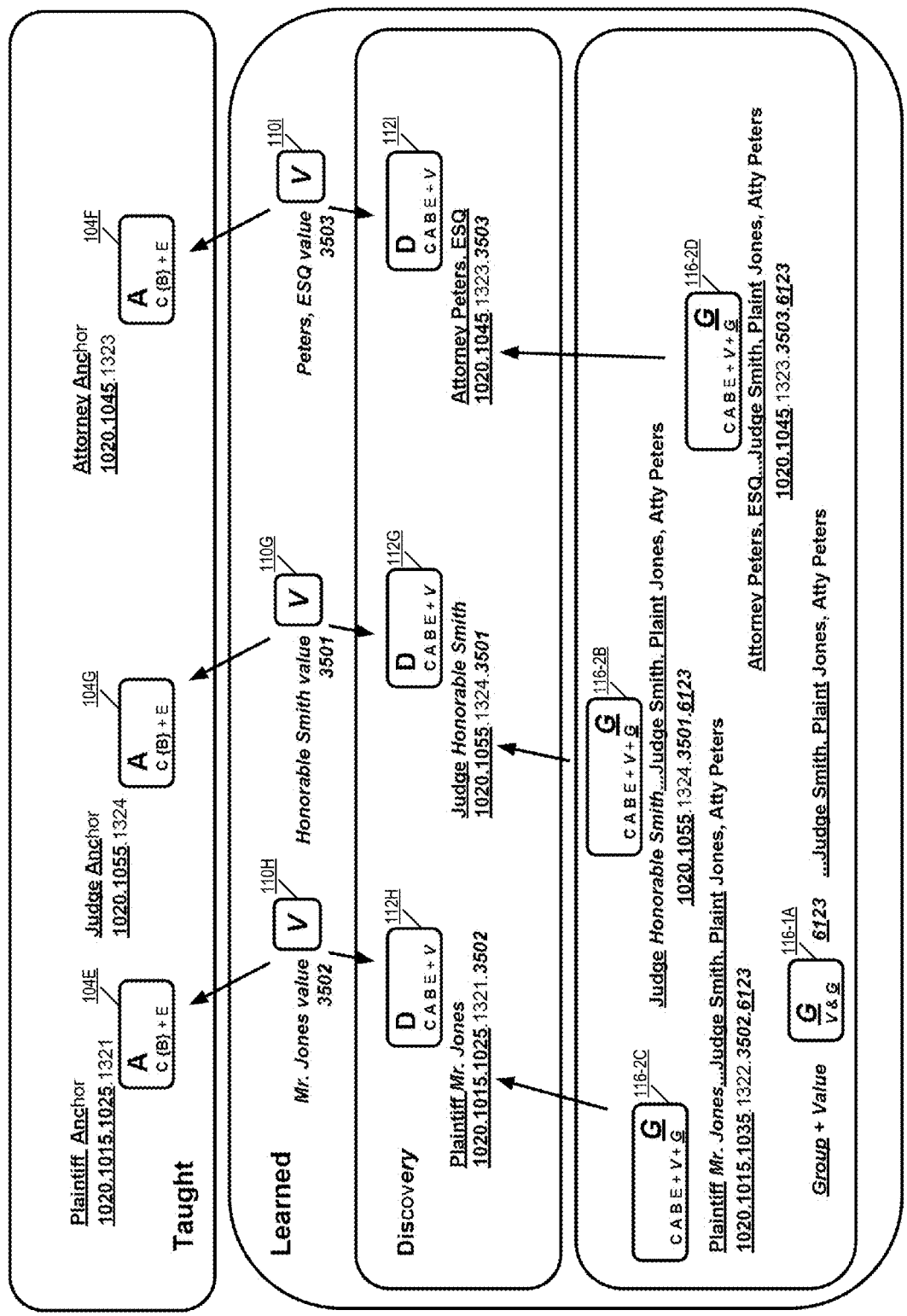

By way of further illustration, FIGS. 2A-D depict various other identifiers/strings (whether single identifiers and/or combinations thereof) and attributes and relationships among them. As also depicted in FIG. 2C, a 'group' identifier can reflect a composite attribute, such as with respect to the association of two (or more) of the same names/parties (e.g., the same judge, e.g., Judge Smith, and plaintiff, e.g., Mr. Jones, with respect to the same data item, e.g., a document, record, case, etc.).

FIG. 2D further depicts various relationships between the identifiers/attributes depicted in FIGS. 2A-C and described herein, such as between and among anchors 104E-F, values 110G-I, discoveries 112G-I, and groups 116-1A and 116-2B-D. For example, as depicted in FIG. 2D, anchor 104E ('1020.1015.1025.1321') and value 110H ('3502') to create discovery 112H ('1020.1015.1025.1321.3502'). Discovery 112H ('1020.1015.1025.1321.3502') can be combined with group 116-1A ('6123'), thereby creating group 116-2C ('1020.1015.1025.1321.3502.6123') (as has been described herein, the referenced group can reflect, for example, an association between another value and/or components thereof and the referenced discovery). In a similar fashion, it will be apparent that various other relationships between other identifiers/strings are also illustrated in FIG. 2D.

As noted, the various identifiers/strings generated and/or associated with a particular data item (e.g., a document, record, etc.) can be stored in an index. In certain implementations, such identifiers/strings can be stored and/or sorted in an index in a manner that ensures that each individual identifier associated with a particular data item is stored separately on at least one row of the index, while other identifiers/strings containing such an identifier are juxtaposed thereto (i.e., are stored in the rows immediately preceding and/or succeeding the individual identifier).

By way of illustration, FIG. 1E depicts various identifiers/strings that may be associated with a particular data item (e.g., a document, record, etc.).

Figure 7:
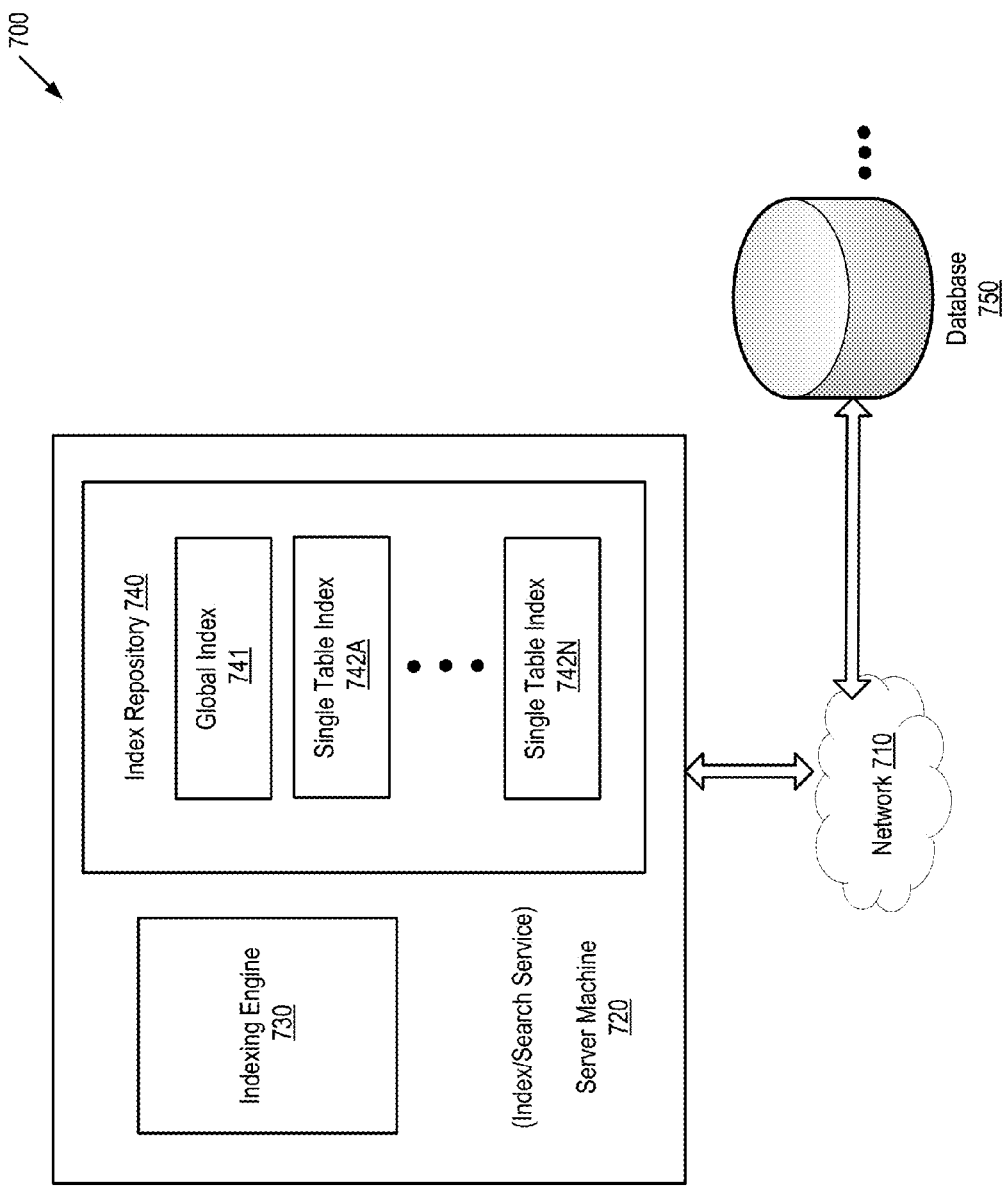
FIG. 7 depicts an illustrative system architecture, in accordance with aspects and implementations of the present disclosure.

FIG. 1F depicts the manner in which such identifiers can be arranged within the index (e.g., an index 742 as depicted in FIG. 7).

It can be appreciated with reference to FIG. 1F that each row is repeated for each identifier contained within it (e.g., 1001, 1010, etc.). A depth level indicator (e.g., '1],' '2]') is shown in front of each row. Such an indicator reflects the position of the identifier with respect to which the row is sorted within the string (for example, Row 'Q' has a depth level indicator of '3],' reflecting that the identifier with respect to which the row is sorted—here, '3522'—is in the third position within the string).

Upon receiving a query (e.g., for one or more search terms), a standard global index (e.g., global index 741 as depicted in FIG. 7) can be initially queried to identify or 'translate' the received search terms into the corresponding identifier(s) and/or strings. For example, upon receiving a query for the term '14-01045,' the global index (containing all identifiers/strings utilized within the database/repository) can be consulted to determine that such a term corresponds to the identifier '3484.'

Upon identifying such an identifier, the various indexes (e.g., indexes 742A-N, as depicted in FIG. 7) associated with the respective data items within the database/repository can be searched, such as by using a binary search for '3484.' In doing so, row M within the index shown above can be found. Having identified such a row, the adjacent rows within the same index can be scanned (e.g., in an up and/or down direction) in order to identify other strings within the index that also contain the identifier '3484.' In doing so, row O ('1010.1001.3484.5672') can be identified.

At this juncture, it should be noted that row O also contains the identifier '5672,' which can be marked as being a similarity attribute (reflecting that it corresponds to a value that may be similar—though not identical to—the original query term). Having identified this identifier (that is, '5672'), a further search for '5672' on the same single table sorted index can be initiated. In doing so, row S can be found. Scanning the rows within the index that are adjacent to row S (which contain strings that include the identifier 5672, and are thus related) further uncovers the string '1010.1001.3522.5672' which refers to case No. 01045 with respect to the referenced similarity attribute.

In a similar fashion the single table sorted index can be searched on for other identifiers '1010' and '1001' to determine that the searched for value of 14-01045 is a case number. In doing so, the various relationships present among the various identifiers can enable more efficient searching (e.g., through the use of binary searches within the single table sorted index) as well as more intelligent search results (being that the described search technique can account for existing relationships and associations between the search term and other known identifiers within the index, thereby providing search results that are likely to be more relevant with respect to the query).

Various aspects of the technologies described herein include one or more methods, such as those described herein. The methods can be performed by processing logic that may comprise hardware (circuitry, dedicated logic, etc.), software (such as is run on a general purpose computer system or a dedicated machine), or a combination of both. For simplicity of explanation, methods are described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Figure 3A:
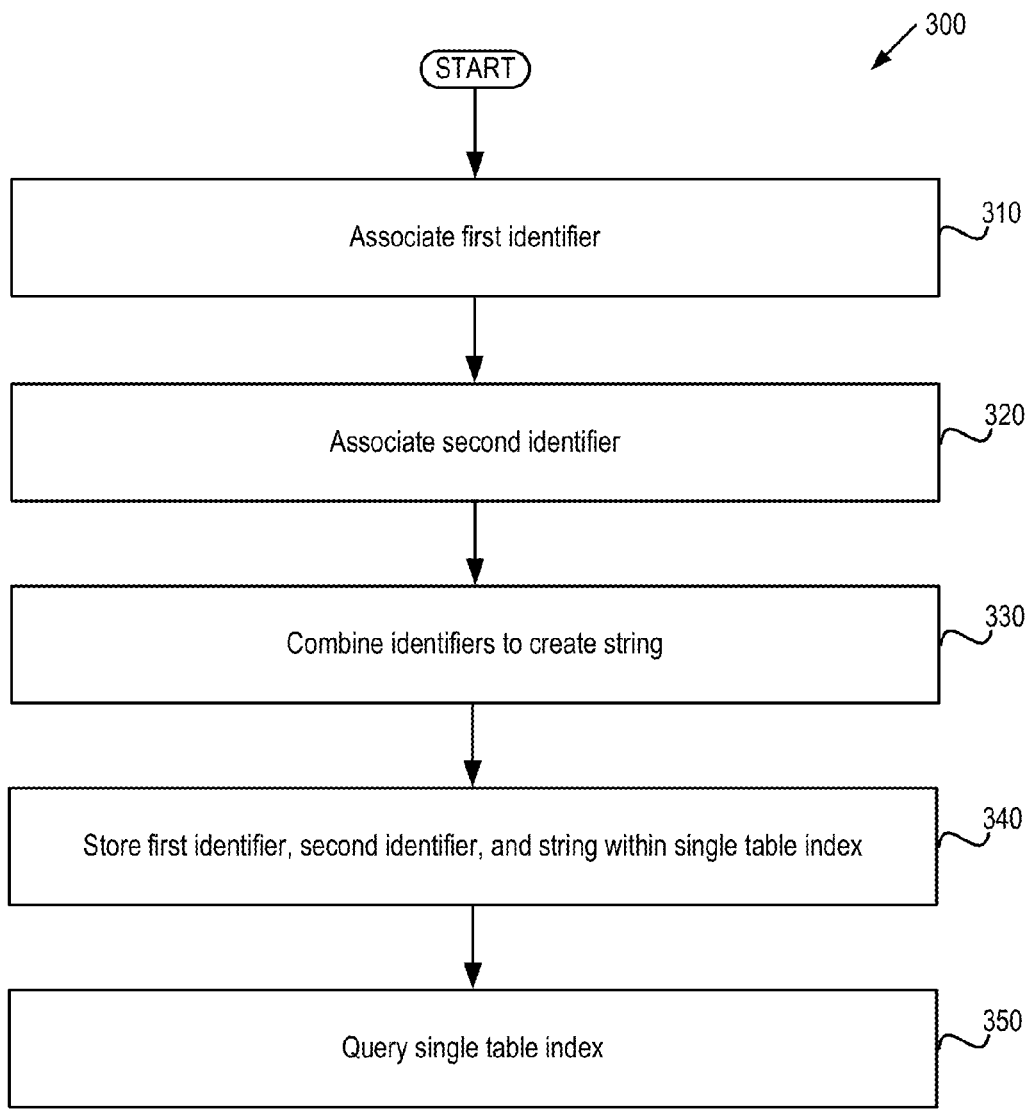
FIGS. 3A-B depict an exemplary flow diagrams showing aspects of a method of indexing and searching using a single table index.

For example, FIG. 3A depicts an exemplary flow diagram showing a method 300 of indexing and searching using a single table index, such as is described herein. It should be understood that one or more operations depicted with respect to FIG. 3A may be performed by and/or in conjunction with one or more elements/components depicted and/or referenced in relation to FIGS. 6 and 7 (including but not limited to indexing engine 730 as depicted in FIG. 7). At block 310, a first identifier can be associated with a data item. At block 320, a second identifier can be associated with the data item. At block 330, the first identifier and the second identifier can be combined to create a string. At block 340, the first identifier, the second identifier, and the string can be stored within a single table index. At block 350, the single table index can be queried to identify at least one of the first identifier, the second identifier, and the string in a single table index.

Figure 3B:
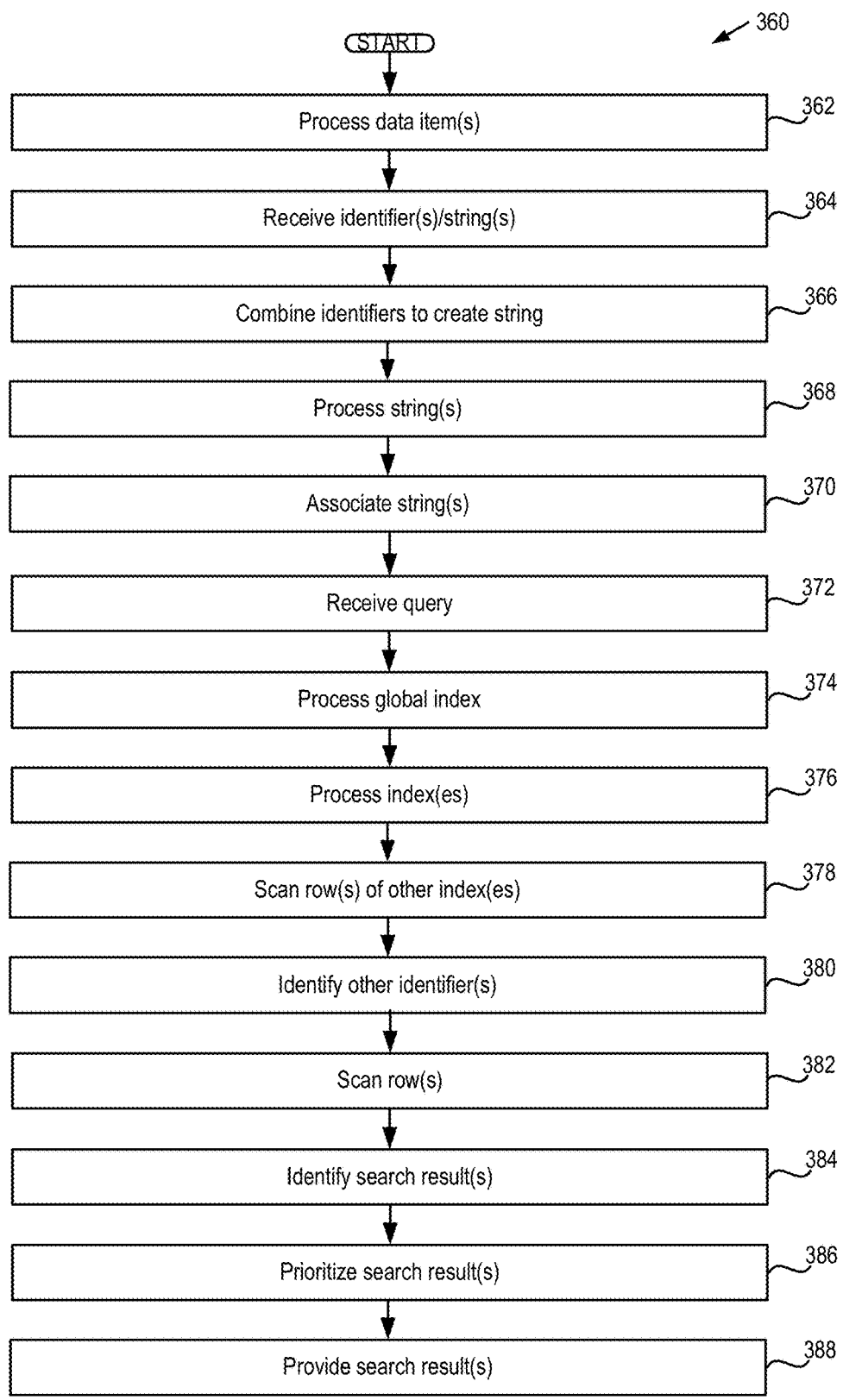

By way of further example, 3B depicts an exemplary flow diagram showing a method 360 of indexing and searching using a single table index, such as is described herein. It should be understood that one or more operations depicted with respect to FIG. 3B may be performed by and/or in conjunction with one or more elements/components depicted and/or referenced in relation to FIGS. 6 and 7 (including but not limited to indexing engine 730 as depicted in FIG. 7). At block 362, one or more data items can be processed, such as in order to identify one or more identifiers and/or one or more strings, such as with respect to the one or more data items. At block 364, one or more identifiers and/or one or more strings can be received, such as with respect to one or more data items. At block 366, multiple identifiers (such as those identified at block 362 and/or received at block 364) associated with a data item can be combined into a string. Such a string can, for example, reflect one or more associations between/among the referenced identifiers, such as in relation to the data item. At block 368, one or more strings (such as those identified at block 362, received at block 364, and/or generated at block 366) can be processed, such as in order to identify one or more characteristics of one or more data items associated with the one or more strings. At block 370, the strings can be associated with another data item (e.g., a data item other than the one that the string(s) were identified, received, and/or generated with respect to), such as based on an identification of the referenced characteristics (e.g., those identified at block 368) with respect to another data item. At block 372, a query can be received. At block 374, a global index associated with a database is processed with respect to the query (e.g., the query received at block 372). In doing so, one or more identifiers and/or one or more strings within the global index that correspond to the query can be identified. At block 376, one or more indexes associated with one or more data items within the database can be processed, such as with respect to the one or more identifiers and/or the one or more strings (e.g., by performing a binary search on the referenced indexes with respect to the referenced identifiers/strings). In certain implementations, such indexes can be processed based on an identification of the identifiers and/or strings within the global index that correspond to the query. It should be understood that, in certain implementations, each of the referenced indexes can, for example, include multiple rows, with each row including an identifier and/or a string. Additionally, the referenced indexes can be generated, structured, and/or otherwise arranged such that various strings that include a particular identifier can be positioned, placed, and/or otherwise arranged in rows of the index that are adjacent and/or proximate to the row containing the referenced identifier (e.g., they are immediately adjacent to the row containing the identifier, or adjacent to a row that is adjacent to the row containing the identifier, or otherwise uninterrupted sequentially by rows that do not contain the identifier). At block 378, one or more rows of the one or more indexes can be scanned to identify additional rows of the one or more indexes that also include the one or more identifiers and/or the one or more strings (e.g., by scanning row(s) of the referenced indexes that are adjacent to the referenced row (that includes the referenced identifier) to identify additional rows of the referenced indexes that are adjacent to the referenced row and that are also include the referenced identifier(s)/string(s)). In certain implementations, such rows can be scanned based on an identification of a presence of the one or more identifiers and/or the one or more strings within a row of the one or more indexes. At block 380, one or more other identifiers (and/or strings) within the one or more rows that are associated with the identifiers and/or the strings can be identified, such as based on a scan of the one or more rows of the one or more indexes. At block 382 one or more rows of the one or more indexes can be scanned to identify additional rows of the one or more indexes that also include the one or more other identifiers. At block 384, one or more search results can be identified in response to the query, based on the scanning of the one or more rows. At block 386, the one or more search results can be prioritized based on one or more respective priority status indicators associated with the one or more search results. At block 388, the one or more search results, as prioritized, can be provided in response to the query.

It should be noted that though much of the forgoing description is directed to implementations pertaining to searching/indexing data items such as legal documents, records, etc., the scope of the present disclosure is not so limited. Accordingly, it should be understood that the technologies described herein can be similarly implemented in any number of other settings and/or contexts. For example, the technologies described herein can be employed with respect to medical documents/charts/records, etc., business records, and/or in practically any context/setting where the storage and retrieval of documents/data items is advantageous.

Accordingly, it can be appreciated that utilizing traditional relational database technologies cannot yield the same performance and/or results as those afforded by the technologies described herein. For example, traditional relational databases do not afford the same hierarchy and relationships as can be achieved using the technologies described herein. For example, if a new category of name emerges then a new table will need to be created and/or new columns will need to be added in a traditional relational database framework. In contrast, the technologies described herein can easily enable the creation of wholly new "types" of groups without affecting existing structures.

Moreover, in traditional relational databases each unique domain of data requires a table with associated fields. Relationships between tables and fields (foreign keys) are all created at design time. Referential integrity dictates that the entire structure be pre-conceived and applied during design time. In contrast, the technologies described herein are not dependent on such relationships, thereby allowing for data that is not of the same domain to be stored under a single key. This supports flexibility during storage.

Additionally, the technologies described herein may only require that a new "row" be entered in order for a new domain to be created (e.g., categorizer). Fields can also then be represented as additional new rows (e.g., end points). The use of multiple domains (e.g., categorizers) bridged together, such as is described herein, provides a level of detail that cannot be achieved using relational database technologies.

As noted, the various operations/functions described herein can be recorded/memorialized within the same single table sorted index—in effect, this can represent what might otherwise be an entire database of a relational database setup.

Accordingly, it can be appreciated that, relative to traditional relational database technologies, relationships expressed using the technologies described herein are relatively more clear and dynamic (e.g., flexible and extensible), and the ability to add new domains or further refine domain detail is inherent in the structure of the database/index itself and need not be anticipated at the outset.

FIG. 5 depicts an exemplary typical traditional relational database (corresponding to a 'personnel table') having three rows of data. It can be appreciated with reference to FIG. 5 that, using a traditional relational database, even in a scenario in which a particular value (e.g., the 'Department' value of a particular entry in the above database) is not known, a 'blank' or placeholder value is still stored. Moreover, in such traditional relational databases, typically only certain fields are 'keyed' into an index for quick lookup (for example, in the above example, only SSN and/or NAME may be so indexed).

Figure 4:
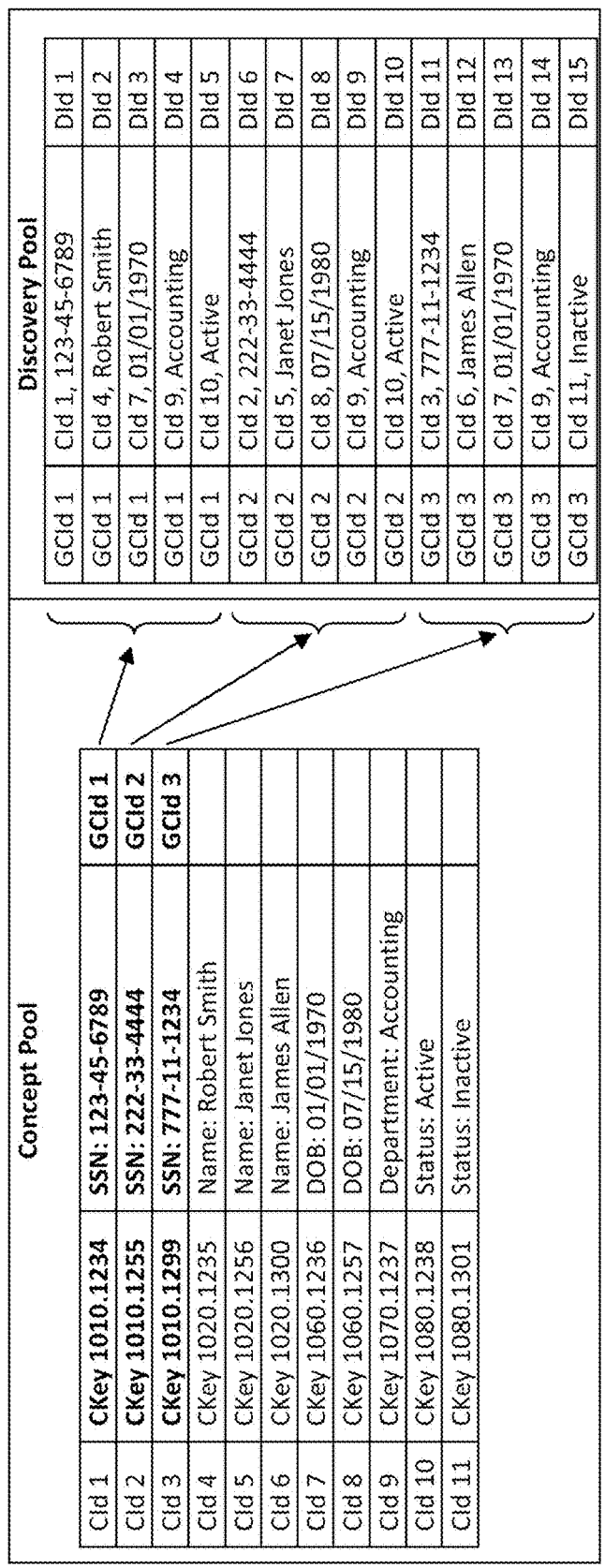
FIG. 4 depicts various further exemplary aspects of the technologies described herein.

Using a single table index framework, such as that described herein, each of the referenced values (e.g., a particular name, social security number, etc.) can be stored 'distinctly' (e.g., only a single time, and not for every record, thereby providing advantages/efficiencies with respect to storage, search/retrieval, etc.). Once such a value is identified/discovered (e.g., with respect to a particular document, record, file, etc.) it can be assigned to/associated with a unique identifier/string, and that same identifier/string can be used whenever that same value is discovered again (e.g., with respect to another document, record, file, etc.). For example, as depicted in FIG. 4, the identifier '1010' can correspond to the category 'SSN' (social security number) and the identifier '1234' can correspond to the specific social security number '123-45-6789.' Accordingly, the respective identifiers can be combined to form a single string/identifier (or 'CKey') ('1010.1234,' as shown in FIG. 4). Each such identifier/string (e.g., '1020.1235' corresponding to 'Name: Robert Smith,' '1070.1237' corresponding to 'Department: Accounting,' etc.) can be stored in a memory array ('Concept Pool,' as shown in FIG. 4). Moreover, each entry or row in such a memory array can be further associated with sequential number or value ('Cid' or Concept ID, as shown numbered 1-11 in FIG. 4). Additionally, it should be understood that, as a result of the referenced items/elements being stored 'distinctly' (as described herein), a Priority Status Number (PSN), such as that described in detail below, can provide/enable various advantages/efficiencies. For example, as more "discoveries" of previously discovered items are made, the power of PSN increases. PSN factors such as accuracy, relevancy and significance are made stronger with each "rediscovery".

In certain implementations, various identifiers/strings can be associated with one another in a manner that reflects one or more relationships/associations that pertain to the manner in which such identifiers/strings are identified/discovered. That is, it can be appreciated that by virtue of the fact that various independent concepts (e.g., name, social security number, department, etc.) can be determined to be present within a single context (e.g., within a particular file, document, record, etc.), various further determinations can be made with respect to relationships/degree of relevance that may exist among such identifiers/strings. Accordingly, in certain implementations, one or more further identifier(s) (referred to as a 'generation concept' and indicated as 'GCId' in FIG. 4) can be associated with each of the identifiers/strings within a memory array (e.g., 'Concept Pool,' as shown in FIG. 4). Such a generation concept can serve to group/associate, for example, multiple identifiers/strings (e.g., various CKeys that correspond to a SSN, name, date of birth, department, etc., such as are depicted in the 'Concept Pool' in FIG. 4) that are related to one another by virtue of being identified/discovered within the same document/file.

By way of illustration, as depicted in FIG. 4, each of the referenced GCIds ('GCId 1,' 'GCId 2,' etc.) can correspond to a particular document/file identifier (e.g., a file path and/or filename) that reflects the source within which a particular identifier/string (e.g., 'SSN: 123-45-6789') was discovered (e.g., by way of processing/parsing the content of the document, such as via optical character recognition (OCR) techniques, natural language processing techniques, manual coding, etc.). Such a GCId can be further associated with one or more entries within another memory array, such as a 'Discovery Pool' as depicted in FIG. 4. Using the referenced GCId, such a discovery pool can group multiple concepts (e.g., identifiers/strings that are present within the 'Concept Pool') that are identified/discovered within a particular context (e.g., within the same file, document, record, etc. to which the GCId corresponds). Thus, it can be appreciated with reference to FIG. 4 that CId 1 ('123-45-6789'), CId 4 ('Robert Smith'), CId 7 ('Jan. 1, 1970'), CId 9 ('Accounting') and CId 10 ('Active') are related to one another by virtue of having been discovered within the same context, and are grouped together accordingly under 'GCId 1.'

It should be further noted that each entry within the discovery pool is associated with a discovery ID ('Did') number ('DId 1,' 'DId 2,' etc.). Being that each concept is included within a single table sorted index, all such concepts can be keyed as indexes with respect to the discovery they are associated with. Thus, each discovery associated with a particular SSN or a particular DOB can just as easily be retrieved. It should be noted that the fact that two records in the example personnel data pool share the same DOB ('Jan. 1, 1970') is a natural by-product of the framework enabled by the described concept/discovery data pools. Accordingly, the two discoveries with the same DOB (e.g., DId 3 and DId 13, as depicted in FIG. 4) can be just as easily retrieved, and can easily and naturally be retrieved together.

Moreover, in certain implementations, identifiers within the referenced concept and discovery pools can also be associated within one or more temporal indicators/aspects. For example, each discovery within a discovery pool can be further associated within a moment pool. Such a moment pool can, for example, include the following parameters, as shown in Table 1:

TABLE 1

| Moment Pool | |
| --- | --- |
| MId | Moment Id (row number) |
| MaxCId | Max Concept Id at this "moment" |
| MaxDId | Max Discovery Id at this "moment" |
| Date | UTC Time (to milliseconds) |

It should be understood that such a moment pool can enable each new "discovery" to be associated with a Moment Id. Rows are added to the Moment Pool when an entity (e.g., a file, document, record, etc.) is consumed for discovery (e.g., is identified and/or retrieved, such as in response to a search query). The moment pool can record the actual "date and time" (e.g., when such a document was retrieved) along with the "maximum" CId and DId for that moment (e.g., based on the sequential ordering of such identifiers within their respective indexes). Through the use of these values the concept and discovery pools have clear access to "what" information is (or was) part of the total knowledge base at any given moment.

Additionally, in certain implementations a Priority Status Number (PSN) can also be incorporated/associated with respect to one or more of the referenced entries. Such a PSN can incorporate one or more aspects/parameters, including but not limited to the "moment of discovery", "source of data", "method of entry", "category of concepts," etc. It should be understood that the PSN can be dynamic and thus may change over time to reflect changes in the "total knowledge base" (e.g., the totality of documents within a database/repository which may change over time). The PSN can also be configured to reflect aspects such as "recency" (e.g., when was a document/file most recently stored, accessed, used, etc.), "frequency" (e.g., how frequently a document/file is accessed) and "use" (e.g., by which users and/or how often). Through the use of one or more weighting techniques, the PSN can be used to indicate the veracity of the data (e.g., with respect to one or more identifiers/strings) and, in turn, can affect the accessibility of the data for a variety of intended purposes. For example, the referenced PSN and/or temporal data can be used in ordering/prioritizing the presentation of search results retrieved in response to a particular query (e.g., certain results can be prioritized/deprioritized based on their respective temporal indicators, PSN, etc.). It should be understood that applying the referenced PSN techniques with respect to the single index database described herein can provide numerous advantages and efficiencies that cannot be achieved using traditional relational database models. The described technologies can achieve near total recall and the described PSN can allow/enable such operation at a very high level of precision (thereby eliminating the conventional precision/recall inverse relationship). This can be achieved, for example, by assigning a value identifier/string ('CKey') to various discoveries that are identified/determined, such as in a manner described herein. The referenced discoveries can include those with 'taught' attributes (e.g., preconceived/predefined notions) as well as 'learned' attributes (which may be, for example, identified or observed based on an analysis of the subject data and/or other data). Such a 'CKey' can be assigned to various discoveries in a data source (e.g., a document, data record, etc.). in certain implementations, even a 'free text' or "bag of words" discovery can be assigned a CKey. In doing so, associated CKey strings can incorporate such discoverie(s), thereby containing a comprehensive record of all associated data and enabling total recall. Additionally, the referenced CKeys can be modified or 'evolve' over time, such as in order to include or incorporate additional or alternate attributes as more discoveries are made and/or the manner of discovery is altered. These attributes and techniques provide the foundation for a database system with very high precision. This foundation is further enhanced by a series of predetermined PSN factors as well as data-specific PSN factors (such as are described herein). In certain implementations, such factors can be dynamic and can be adjusted, updated, modified, or otherwise changed, such as in order to maintain precision, such as in scenarios in which as the subject data becomes better understood and/or the needs of the user change over time. Accordingly, the described technologies, including the referenced dynamic CKey attributes and multi-factor PSN, provide highly accurate and/or relevant results to a search query, in both a comprehensive and precise manner.

Figure 6:
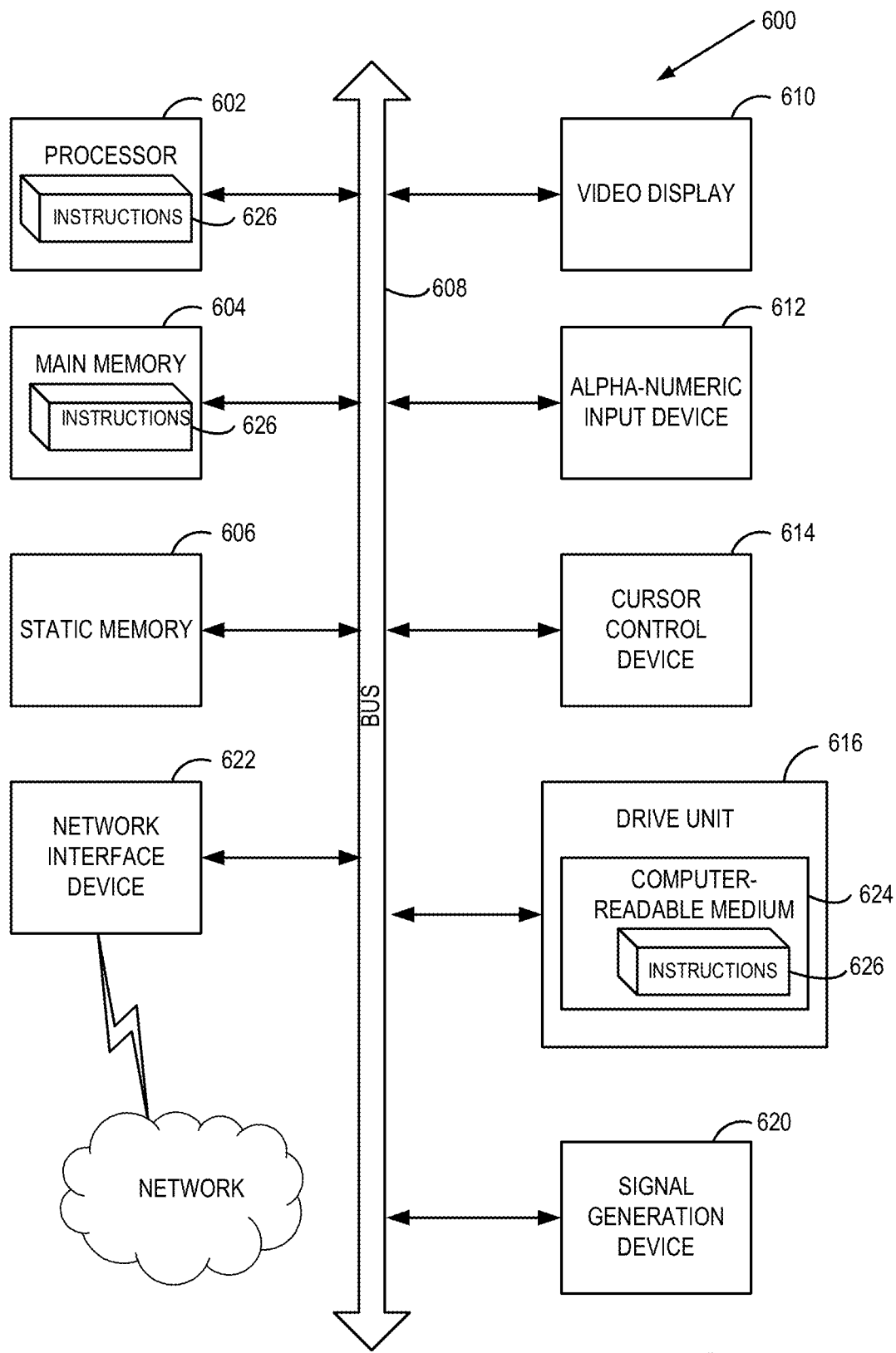
FIG. 6 depicts a block diagram of an illustrative computer system operating in accordance with aspects and implementations of the present disclosure.

FIG. 6 depicts an illustrative computer system within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server machine in client-server network environment. The machine may be a personal computer (PC), a mobile or tablet computer, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing system (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 608.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 626 for performing the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a computer-readable medium 624 on which is stored one or more sets of instructions 626 (e.g., instructions executed by collaboration manager 225, etc.) embodying any one or more of the methodologies or functions described herein. Instructions 626 may also reside, completely or at least partially, within the main memory 604 and/or within the processor 602 during execution thereof by the computer system 600, the main memory 604 and the processor 602 also constituting computer-readable media. Instructions 626 may further be transmitted or received over a network via the network interface device 622.

While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

FIG. 7 depicts an illustrative system architecture 700, in accordance with one implementation of the present disclosure. The system architecture 700 includes server machine 720 and database 750. These various elements or components can be connected to one another via network 710, which can be a public network (e.g., the Internet), a private network (e.g., a local area network (LAN) or wide area network (WAN)), or a combination thereof. Alternatively, server machine 720 and database 750 can be connected directly to one another and/or combined within a single machine.

Server machine 720 can be a rackmount server, a router computer, a personal computer, a portable digital assistant, a mobile phone, a laptop computer, a tablet computer, a camera, a video camera, a netbook, a desktop computer, a media center, any combination of the above, or any other such computing device capable of implementing the various features described herein. Server machine 720 can include components such as indexing engine 730 and index repository 740. The components can be combined together or separated in further components, according to a particular implementation. It should be noted that in some implementations, various components of server machine 720 may run on separate machines. Moreover, some operations of certain of the components are described in more detail herein.

Index repository 740 can be hosted by one or more storage devices, such as main memory, magnetic or optical storage based disks, tapes or hard drives, NAS, SAN, and so forth. In some implementations, index repository 740 can be a network-attached file server, while in other implementations index repository 740 can be some other type of persistent storage such as an object-oriented database, a relational database, and so forth, that may be hosted by the server machine 720 or one or more different machines coupled to the server machine 720 via the network 710, while in yet other implementations index repository 740 may be a database that is hosted by another entity and made accessible to server machine 720.

Index repository 740 can include various indexes, such as global index 741 and single table indexes 742A-742N (each of which can include various identifiers/strings and can be associated with various data items, documents, etc., and/or elements thereof that are stored in database 750), such as are described in detail herein.

It should be understood that though FIG. 7 depicts server machine 720 and database 750 as being discrete components, in various implementations any number of such components (and/or elements/functions thereof) can be combined, such as within a single component/system.

Database 750 can be a rackmount server, a router computer, a personal computer, a portable digital assistant, a mobile phone, a laptop computer, a tablet computer, a camera, a video camera, a netbook, a desktop computer, a media center, any combination of the above, or any other such computing device capable of implementing the various features described herein. Additionally, in certain implementations database 750 can include or otherwise incorporate one or more storage devices, such as main memory, magnetic or optical storage based disks, tapes or hard drives, NAS, SAN, and so forth. In some implementations, database 750 can be a network-attached file server, while in other implementations database 750 can be some other type of persistent storage such as an object-oriented database, a relational database, and so forth. As described in detail herein, database 750 can include, for example, various data or content items, records, documents, etc. It should be noted that in some implementations, various components of database 750 may run on separate machines. Moreover, some operations of certain of the components are described in more detail herein.

As described in detail herein, various indexing and searching operations can be performed by system 700, such as in order to search for/retrieve data items, documents, etc., within database 750, such as in response to a query. In certain implementations, such operations can be performed by and/or in conjunction with indexing engine 730.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing," "receiving," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Aspects and implementations of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. Moreover, the techniques described above could be applied to other types of data instead of, or in addition to those described and/or referenced herein. The scope of the disclosure should, therefore, be determined with reference to the appended claims, along with the full scope of equivalents to which such claims are entitled.

What is claimed is:

1. A method comprising:
receiving a query;
processing a global index associated with a database with respect to the query to identify one or more identifiers within the global index that correspond to the query;
based on an identification of the one or more identifiers within the global index that correspond to the query, processing, by a processing device, one or more indexes associated with one or more data items within the database with respect to the one or more identifiers;
based on an identification of a presence of the one or more identifiers within a row of at least one of the one or more indexes, scanning one or more rows of the at least one of the one or more indexes to identify one or more additional rows of the at least one of the one or more indexes that also include the one or more identifiers;
based on a scan of the one or more rows of the at least one of the one or more indexes, identifying one or more other identifiers within the one or more rows that are associated with the one or more identifiers;
scanning one or more rows of the at least one of the one or more indexes to identify one or more additional rows of the at least one of the one or more indexes that also include the one or more other identifiers;
based on the scanning of the one or more rows, identifying one or more search results in response to the query;
prioritizing the one or more search results based on one or more respective priority status indicators associated with the one or more search results; and
providing the one or more search results, as prioritized, in response to the query.

2. The method of claim 1, further comprising processing the one or more data items to identify the one or more identifiers with respect to the one or more data items.

3. The method of claim 1, further comprising receiving the one or more identifiers with respect to the one or more data items.

4. The method of claim 1, further comprising combining a plurality of identifiers associated with a data item into a string that reflects one or more associations between the plurality of identifiers in relation to the data item.

5. The method of claim 1, further comprising processing the one or more identifiers to identify one or more characteristics of one or more data items associated with the one or more identifiers.

6. The method of claim 5, further comprising, based on an identification of the one or more characteristics with respect to another data item, associating the one or more identifiers with the another data item.

7. The method of claim 1, wherein processing the one or more indexes associated with the one or more data items within the database with respect to the one or more identifiers comprises performing a binary search on the one or more indexes associated with the one or more data items within the database with respect to the one or more identifiers.

8. The method of claim 1, wherein scanning the one or more rows of the at least one of the one or more indexes comprises scanning one or more rows of the at least one of the one or more indexes that are adjacent to the row of the at least one of the one or more indexes to identify one or more additional rows of the at least one of the one or more indexes that are adjacent to the row of the at least one of the one or more indexes and that also include the one or more identifiers.

9. The method of claim 1, wherein identifying one or more other identifiers within the one or more rows that are associated with the one or more identifiers comprises identifying one or more strings within the one or more rows that include the one or more identifiers.

10. The method of claim 1, wherein the one or more identifiers comprises a composite of one or more identifiers.

11. The method of claim 1, wherein the one or more identifiers reflects a relationship between two or more identifiers.

12. The method of claim 1, wherein the one or more identifiers reflects a similarity between two or more identifiers.

13. The method of claim 1, wherein the one or more identifiers comprises at least one of: a temporal identifier, a relevancy identifier, or an accessibility identifier.

14. The method of claim 1, wherein the one or more respective priority status indicators comprise an indicator that reflects at least one of: an accuracy of the data, a relevancy of the data to the query, control of the data, or significance of the data.

15. The method of claim 1, wherein each of the one or more indexes comprises a plurality of rows, each of the plurality of rows comprising at least one of an identifier or a string.

16. The method of claim 15, wherein each of the one or more indexes comprises a row comprising an identifier, wherein one or more strings that include the identifier are arranged in rows of the index that are adjacent to the identifier.

17. The method of claim 15, wherein each of the one or more indexes comprises a row comprising an identifier, wherein one or more strings that include the identifier are arranged in rows of the index that are proximate to the identifier.

18. The method of claim 15, wherein each of the one or more indexes comprises a row comprising each of the one or more identifiers present within the index.

19. A system comprising:
a memory; and
a processing device, operative coupled to the memory, the processing device to:
receive a query;
process a global index associated with a database with respect to the query to identify one or more identifiers within the global index that correspond to the query;
based on an identification of the one or more identifiers within the global index that correspond to the query, process one or more indexes associated with one or more data items within the database with respect to the one or more identifiers;
based on an identification of a presence of the one or more identifiers within a row of at least one of the one or more indexes, scan one or more rows of the at least one of the one or more indexes that are adjacent to the row of the at least one of the one or more indexes to identify one or more additional rows of the at least one of the one or more indexes that are adjacent to the row of the at least one of the one or more indexes and that also include the one or more identifiers;

based on a scan of the one or more adjacent rows of the at least one of the one or more indexes, identify one or more other identifiers within the one or more adjacent rows that are associated with the one or more identifiers;

scan one or more rows of the at least one of the one or more indexes to identify one or more additional rows of the at least one of the one or more indexes that also include the one or more other identifiers;

based on the scanning of the one or more rows, identify one or more search results in response to the query;

prioritize the one or more search results based on one or more respective priority status indicators associated with the one or more search results; and provide the one or more search results, as prioritized, in response to the query.

20. A non-transitory computer-readable medium having instructions stored thereon that, when executed by a processing device, cause the processing device to:

receive a query;

process a global index associated with a database with respect to the query to identify, by the processing device, one or more identifiers within the global index that correspond to the query;

based on an identification of the one or more identifiers within the global index that correspond to the query, process one or more indexes associated with one or more data items within the database with respect to the one or more identifiers, wherein each of the one or more indexes comprises a plurality of rows, each of the plurality of rows comprising at least one of an identifier or a string, wherein each string that includes an identifier is arranged in a row of the index that is proximate to the identifier;

based on an identification of a presence of the one or more identifiers within a row of at least one of the one or more indexes, scan one or more rows of the at least one of the one or more indexes that are adjacent to the row of the at least one of the one or more indexes to identify one or more additional rows of the at least one of the one or more indexes that are adjacent to the row of the at least one of the one or more indexes and that also include the one or more identifiers;

based on a scan of the one or more adjacent rows of the at least one of the one or more indexes, identify one or more other identifiers within the one or more adjacent rows that are associated with the one or more identifiers;

scan one or more rows of the at least one of the one or more indexes to identify one or more additional rows of the at least one of the one or more indexes that also include the one or more other identifiers;

based on the scanning of the one or more rows, identify one or more search results in response to the query;

prioritize the one or more search results based on one or more respective priority status indicators associated with the one or more search results; and provide the one or more search results, as prioritized, in response to the query.

* * * * *